US011407029B2

(12) United States Patent
Zhou

(10) Patent No.: US 11,407,029 B2
(45) Date of Patent: Aug. 9, 2022

(54) METHOD FOR PROCESSING AND MANUFACTURING A METAL STRUCTURAL MATERIAL BY A COILING, SINTERING AND PLASTIC WORKING OF A METAL SCREEN MESH

(71) Applicant: South China University of Technology, Guangzhou (CN)

(72) Inventor: Zhaoyao Zhou, Guangzhou (CN)

(73) Assignee: South China University of Technology, Guangzhou (CN)

( * ) Notice: Subject to any disclaimer, the term of this patent is extended or adjusted under 35 U.S.C. 154(b) by 706 days.

(21) Appl. No.: 16/313,988

(22) PCT Filed: Dec. 12, 2016

(86) PCT No.: PCT/CN2016/109470
§ 371 (c)(1),
(2) Date: Dec. 28, 2018

(87) PCT Pub. No.: WO2018/000739
PCT Pub. Date: Jan. 4, 2018

(65) Prior Publication Data
US 2019/0151953 A1    May 23, 2019

(30) Foreign Application Priority Data
Jun. 29, 2016  (CN) .......................... 201610508493.9

(51) Int. Cl.
| | | |
|---|---|---|
| *B22F 5/10* | (2006.01) | |
| *B22F 3/00* | (2021.01) | |
| *B22F 7/00* | (2006.01) | |
| *B23P 15/16* | (2006.01) | |
| *B22F 5/00* | (2006.01) | |
| *B29C 33/38* | (2006.01) | |
| *B22F 3/16* | (2006.01) | |
| *C22C 47/04* | (2006.01) | |
| *C22C 47/06* | (2006.01) | |
| *B22F 3/20* | (2006.01) | |
| *B23P 15/00* | (2006.01) | |
| *C22C 47/14* | (2006.01) | |
| *B22F 3/10* | (2006.01) | |

(52) U.S. Cl.
CPC ................ *B22F 5/10* (2013.01); *B22F 3/001* (2013.01); *B22F 3/16* (2013.01); *B22F 3/20* (2013.01); *B22F 7/002* (2013.01); *B23P 15/00* (2013.01); *B23P 15/16* (2013.01); *B29C 33/38* (2013.01); *C22C 47/04* (2013.01); *C22C 47/066* (2013.01); *B22F 3/1021* (2013.01); *B22F 5/006* (2013.01); *B22F 5/007* (2013.01); *B22F 5/106* (2013.01); *B22F 2998/10* (2013.01); *C22C 47/14* (2013.01)

(58) Field of Classification Search
CPC ........................................................ B22F 5/10
See application file for complete search history.

(56) References Cited

U.S. PATENT DOCUMENTS

| | | | | |
|---|---|---|---|---|
| 3,887,365 A | * | 6/1975 | Sherfey ..................... | B22F 3/00 419/2 |
| 4,562,039 A | * | 12/1985 | Koehler .................... | B22F 3/22 419/2 |
| 6,381,822 B1 | | 5/2002 | Watanabe et al. | |
| 8,221,850 B2 | | 7/2012 | Fuwa | |

FOREIGN PATENT DOCUMENTS

| | | |
|---|---|---|
| CN | 1153688 A | 7/1997 |
| CN | 1907642 A | 2/2007 |
| CN | 101705453 A | 5/2010 |
| CN | 103266288 A | 8/2013 |
| CN | 104002101 A | 8/2014 |
| CN | 104099539 A | 10/2014 |
| CN | 104209518 A | 12/2014 |
| CN | 104259460 A | 1/2015 |
| CN | 104857775 A | 8/2015 |
| CN | 106077665 A | 11/2016 |
| CN | 104384395 B | 2/2017 |
| JP | 472004 A | 3/1992 |
| JP | 633112 A | 2/1994 |
| JP | 20002272 A | 1/2000 |
| JP | 2008156701 A | 7/2008 |

OTHER PUBLICATIONS

Sutherland, Ken. (2008). Filters and Filtration Handbook (5th Edition)—2.4.1 Woven Wire Mesh. (pp. 67-76). Elsevier (Year: 2008).*

* cited by examiner

*Primary Examiner* — Jophy S. Koshy
*Assistant Examiner* — Joshua S Carpenter
(74) *Attorney, Agent, or Firm* — The Webb Law Firm

(57) ABSTRACT

Provided is a method for processing and manufacturing a metal structural material by knitting metal wires into metal screen mesh strips, tightly coiling the metal screen mesh strips to form a coiled blank body which is coated layer-by-layer and in which an outer-layer material tightly covers an inner-layer material; sintering the coiled blank body; reducing gaps within the coiled blank body material by plastic processing to reach a porosity that fulfills requirements, and manufacturing mechanical structural parts therefrom.

9 Claims, No Drawings

METHOD FOR PROCESSING AND MANUFACTURING A METAL STRUCTURAL MATERIAL BY A COILING, SINTERING AND PLASTIC WORKING OF A METAL SCREEN MESH

CROSS REFERENCE TO RELATED APPLICATIONS

This application is the United States national phase of International Application No. PCT/CN2016/109470 filed Dec. 12, 2016, and claims priority to Chinese Patent Application No. 201610508493.9 filed Jun. 29, 2016, the disclosures of each of which are hereby incorporated by reference in their entireties.

BACKGROUND OF THE INVENTION

Field of the Invention

The present invention relates to the technical field of manufacturing a metal structural material, in particular to a method for processing and manufacturing a metal structural material under a coiling and sintering pressure of a metal screen mesh.

Description of Related Art

Japanese Patent Laid-Open Publication No. 4-72004 disclosed a method of producing a porous mold. The method was to press SUS434 stainless steel particles into a compacted body, which was sintered, nitrided, and cooled rapidly in a furnace to form a sintered porous block. Japanese Patent Laid-Open Publication No. 6-33112 disclosed a method of producing a porous mold material. The method was to press the mixture of 80 wt % of powder composed of low C and low N—Cr stainless steel particles and 20 wt % of stainless steel fiber (having a circumcircle diameter of the rectangular cross section of 20-100 μm and a length of 0.4-3.0 mm) into a compacted body; the compacted body was then sintered into a sintered body, which was heated in nitrogen to form a nitride that was then cooled and reheated to prepare a porous mold material. Chinese Patent Application No. 96122336.2 disclosed a porous mold material for casting and a method for producing the material. The method was to mix SUS434 stainless steel particles (having a particle size of mainly 300-500 μm) and long SUS434 stainless steel fibers (having a circumcircle diameter of the rectangular cross section of 60-80 μm and a length of 2.0-3.5 mm) pulverized by a rotary milling machine RCM400 at a weight ratio of 40%:60% to 65%:35%, and the mixture was subjected to pressurization, sintering, nitrogen blasting treatment, cooling and reheating to form a porous mold material. The stainless steel particles or fibers used in the above patent were SUS434 ferritic stainless steel materials and could not be reinforced by heat treatment processes including quenching and tempering; besides, because the long SUS434 stainless steel fibers with a rectangular cross section was pulverized by the rotary milling machine RCM400, micro cracks would be left on the fiber, and the micro cracks and other defects in the long fiber that was pulverized by the rotary milling machine RCM400 would affect the reinforcing effect when the fiber was used as a fiber-reinforced phase for producing a porous mold material; moreover, the method had a long technological process and high cost. Chinese Patent Application No. 200610037007.6 disclosed a method for manufacturing and applying a self-permeable metal die, which was difficult to be used for mixing fibers and powders and could only be manually implemented, making it difficult to achieve automated production. Chinese Patent Application No. 201410440413.1 disclosed a method for preparing short metal fibers and a chopping device for cutting metal fibers short, with the method for preparing the short metal fibers as follows: first, a long metal fiber wire was fed forward by a feeding mechanism to enter a through die hole of a fixed cutter die through a guiding tube, wherein the fixed cutter die was matched with a movable cutter die to cooperatively cut the long metal fiber wire, and the exit of the through die hole of the fixed cutter die was a cutting edge; then, the long metal fiber wire was continuously fed forward by the feeding mechanism to pass through the through die hole of the fixed cutter die; when the long metal fiber wire protruded through the through die hole to a preset length, the movable cutter die was circularly moved with its straight cutting edge passing and close to the cutting edge of the die hole of the fixed cutter die to realize the shearing motion of the two cutting edges, such that the long metal fiber wire protruding through the through die hole was cut to obtain the short fiber of a desired length; and then the short fiber was pressed and sintered to produce the porous metal material. Cutting the fibers short would wear the tool, consume electrical energy and take time, and the discontinuity of the fibers distributed in the material would result in a decrease in mechanical properties.

Chinese Patent Application No. 201410225398.9 disclosed a method for manufacturing a long fiber texture structure metal material, which was as follows: First the long metal fiber wire was tightly knitted to form a knitting body; then the gaps in the knitting body were eliminated by plastic working, and metallurgical bonding was achieved between the wires; and finally a desired dense metal material having a long fiber texture structure, i.e., a non-porous metal material, could be produced. The knitting body was in the form of a rope, a tube, a section, a plate or a block. The corresponding materials could only be knitted by using a three-dimensional knitter, with complicated equipment, low efficiency and high cost.

SUMMARY OF THE INVENTION

An object of the present invention is to overcome the deficiencies and shortcomings of the prior art, and to provide a reliable, high-efficiency, easy-to-control method for processing and manufacturing a metal structural material under a coiling and sintering pressure of a metal screen mesh; the overall technological process is short, making it easy to achieve automatic and large-scale production, and the overall cost is low.

To achieve the above object, the technical solution provided by the present invention is as follows: A method for processing and manufacturing a metal structural material under a coiling and sintering pressure of a metal screen mesh: firstly, knitting metal wires into metal screen mesh strips, and tightly coiling the metal screen mesh strips to form a coiled blank body which is coated layer-by-layer and in which an outer-layer material tightly covers an inner-layer material; then, sintering the coiled blank body; reducing gaps within the coiled blank body material by plastic working so as to reach a porosity that fulfills requirements, finally manufacturing and obtaining the required porous metal structural material, and manufacturing mechanical structural parts by using a mechanical processing method.

The plastic working can be performed before sintering, and plastic working and sintering can be repeatedly performed.

When the metal screen mesh strips are tightly coiled, the metal powder with uniform thickness is uniformly distributed on the metal screen mesh and uniformly tightly coiled between layers of the metal screen mesh. After sintering and plastic working, a powder metallurgy breathable metal material reinforced by the metal screen mesh can be obtained.

The powder metallurgy breathable metal material is breathable steel.

The metal powder is rolled on a metal screen mesh strip, sintered, and then coiled into a coiled blank.

The metal powder is formulated into a mixed slurry that is then uniformly distributed on the metal screen mesh, and then the metal powder is uniformly tightly coiled between layers of the metal screen mesh, dried and then sintered.

After the metal powder is formulated into a binder-containing mixture, the metal powder is uniformly distributed on and adhered to the metal screen mesh, uniformly tightly coiled between layers of the metal screen mesh, and then sintered after the binder is removed by heating.

The tightly coiling the metal screen mesh strips means that the metal screen mesh strips are coiled on a mandrel by rotating the mandrel, with the thickness of the material increased with the coiling accumulation of the strips, thus forming a coiled blank body which is coated tightly layer-by-layer.

The mandrel is a rod mandrel, a plate mandrel or a tubular mandrel.

The obtained porous metal structural material is in the form of a bar, a tube, a section, a plate or a block.

The present invention has the following advantages and beneficial effects compared with the prior art:
1. The present invention may be used for manufacturing a porous metal structural material with high porosity, high mechanical property, and a density that is smaller than the density of a dense metal of the same material. If this material is processed into mechanical parts, the weight of the mechanical structure can be reduced.
2. The fibers of the metal structural material reinforced by long fiber texture produced by the method of the present invention are continuous and not cut. The material has high tensile strength and high fatigue strength of the wire, and can be processed into mechanical structural parts like ordinary metal materials. Therefore, the material has a wide range of applications, and can bring significant economic benefits.
3. The breathable steel can be used to make dies, such that gas can be discharged through the die material during die forming that requires removal of gas from the die cavity.
4. The microstructure of the material is uniform and reproducible, and the processing technology and properties of the material are controllable.
5. The substance attached to the surface of the wire by surface treatment is uniformly distributed into the prepared material along with the wire.
6. Infiltrated nitrogen and carbon can penetrate the connected pores and reach the inside of the material, such that the corrosion resistance and mechanical properties of the material are greatly improved.
7. The porous metal structural material of the present invention has a large damping factor and can absorb vibration, and the mechanical parts manufactured by the material can reduce the vibration of the mechanical structure.
8. Knitting the metal wire into a metal screen mesh is a two-dimensional knitting process with high efficiency and low cost, and the coiling process is simple, reliable, high in efficiency, low in cost and easy to control.
9. The overall technological process is short, making it easy to achieve automatic and large-scale production; overall, the efficiency is high, and the cost is low.

DETAILED DESCRIPTION

The present invention will be further described below with reference to a number of specific examples.

Example 1

The method for processing and manufacturing a metal structural material under a coiling and sintering pressure of a metal screen mesh according to the present invention is as follows: firstly, knitting metal wires into metal screen mesh strips, and tightly coiling the metal screen mesh strips to form a coiled blank body which is coated layer-by-layer and in which an outer-layer material tightly covers an inner-layer material; then, sintering the coiled blank body, and achieving metallurgical bonding between the materials; reducing gaps within the coiled blank body material by plastic working (forging, extrusion, drawing or rolling, etc.) so as to reach a porosity that fulfills requirements, finally manufacturing and obtaining the required porous metal structural material (can be in the form of a bar, a tube, a section, a plate or a block), and manufacturing mechanical structural parts by using a mechanical processing method.

In this example, 1Cr18Ni9 stainless steel wires having a diameter of 35 µm were used to be tightly knitted by a knitter into a stainless steel metal cloth having a width of 1 m, and one end of the stainless steel screen strip was then fixed to a stainless steel round mandrel having a diameter of 20 mm; a motor drive mechanism rotated the round mandrel to tightly coil the stainless steel screen strip on the round mandrel with the ends aligned, such that a stainless steel screen strip round bar-shaped coiled blank body which was coated layer-by-layer and in which an outer-layer material tightly covered an inner-layer material was formed. After the outer dimensions reached the required diameter of 200 mm, the stainless steel screen strip was cut short, and the stainless steel screen strip coiled blank body was bundled with a steel wire to keep the blank body from being loosened, and then it was heated in a vacuum sintering furnace to 1320° C. and kept at that temperature for 2 h so as to get sintered, such that metallurgical bonding was achieved between layers of the screen strip material and between the wires. After being sintered, the blank body material was rolled repeatedly by a bar mill to densify the blank body material and reduce gaps within the coiled blank body material to finally reach a porosity of 30%, and the required porous metal structural bar material was obtained and then manufactured into a shaft part by a mechanical processing method.

Example 2

Different from Example 1, the round mandrel placed in the center was removed before sintering.

Example 3

Different from Example 1, a second sintering was performed after repeated rolling, and then rolling was performed again.

Example 4

Different from Example 1, the metal wire used in this example was made of a copper alloy, and the sintering to achieve metallurgical bonding was performed by heating in a vacuum furnace to 810° C. and keeping at that temperature for 2 h.

Example 5

Different from Example 1, the metal wire used in this example was made of an aluminum alloy, and the sintering to achieve metallurgical bonding was performed by heating in a vacuum furnace to 630° C. and keeping at that temperature for 2 h.

Example 6

Different from Example 1, this example used a knitter to obtain a stainless steel screen strip having a pore size of 300 mesh and a width of 1 m.

Example 7

Different from Example 1, this example used a bundle of 1Cr18Ni9 stainless steel wires having a diameter of 35 μm (100 wires per bundle) for knitting.

Example 8

Different from Example 2, this example placed the sintered material between flat dies for pressing.

Example 9

Different from the Example 1, this example used a metal plate of 8 mm in thickness, 40 mm in width and 1200 mm in length as the mandrel, and the coiled blank body was plate-shaped and sintered after the mandrel plate was removed to obtain a porous metal structural plate, which was stamped into a housing part.

Example 10

Different from Example 1, this example used a square rod having a side length of 20 mm as the mandrel to obtain a porous metal structural material having a square section.

Example 11

Different from Example 1, this example used a metal tube having an inner diameter of 30 mm and a wall thickness of 15 mm as the mandrel, which was not removed during sintering, so as to obtain a tubular porous metal structural material.

Example 12

Different from the Example 9, this example used a metal plate of 2 mm in thickness, 40 mm in width and 1200 mm in length as the mandrel, and the coiled blank body was block-shaped and sintered after the mandrel plate was removed to obtain a porous metal structural block.

Example 13

Different from the Example 1, this example kept the stainless steel metal cloth strip horizontal before tightly coiling it, a powder feeding mechanism transported the stainless steel metal powder to the metal cloth strip, and a scraper scraped the powder on the metal cloth strip and controlled the thickness of the powder to be 0.2 mm, so that the stainless steel metal screen mesh was uniformly laid with the stainless steel metal powder with uniform thickness; then the stainless steel metal powder was uniformly tightly coiled between layers of the metal cloth, which was sintered to achieve metallurgical bonding between the wire and the powder and then subjected to plastic pressure processing, thereby obtaining a powder metallurgy breathable metal material uniformly reinforced by the metal cloth for manufacturing breathable plastic molding dies.

Example 14

Different from the Example 13, this example performed a second sintering and a second plastic pressure processing.

Example 15

Different from the Example 13, this example employed mixed metal powder.

Example 16

Different from the Example 1, this example used a No. 20 steel material as the wire.

Example 17

Different from the Example 1, this example used a metal wire that was subjected to a nitriding surface treatment before being knitted, and the wire with a nitrided surface film formed on the surface was tightly knitted into a porous metal structural material reinforced by a long fiber texture structure.

Example 18

Different from Example 17, this example used a metal wire that was subjected to a carburized surface treatment, such that a carbonized surface film was formed on the surface of the wire.

Example 19

Different from Example 17, this example used a metal wire that was subjected to a carbonitriding surface treatment.

Example 20

Different from Example 17, this example used a metal wire that was subjected to a nickel plating surface treatment.

Example 21

Different from Example 17, this example used a metal wire that was subjected to chrome plating after nickel plating.

Different from the Example 1, this example used a bearing steel wire as the metal wire.

Example 22

Different from the Example 1, this example used a wire having a diameter of 500 μm.

Example 23

Different from the Example 13, the metal powder was rolled and then sintered on the metal screen mesh strip, and then the strip was coiled into a coiled blank.

Example 24

Different from the Example 13, this example formulated the metal powder into a mixed slurry and then uniformly distributed the slurry on the metal screen mesh, and then the metal powder was uniformly tightly coiled between layers of the metal screen mesh, heated and dried and then sintered, so as to achieve metallurgical bonding between the wire and the powder.

Example 25

Different from the Example 13, this example formulated the metal powder into a mixture containing a polymer binder and then uniformly distributed the mixture on the metal screen mesh, and then the metal powder was uniformly tightly coiled between layers of the metal screen mesh, heated to get the polymer binder decomposed, volatilized and removed, and then sintered so as to achieve metallurgical bonding between the wire and the powder.

In summary, the principle of the method of the present invention is as follows: When the metal wire is knitted into a metal screen mesh, the metal screen mesh is coiled over and over until a certain size is reached, and subjected to sintering and plastic pressure processing to obtain a metal volume material. The wires are mutually confined due to the knitted structure and the layer-by-layer coating. Since the wire is not cut, the long fiber texture is continuous in the prepared new material, and the new material composed of the wire has a long fiber texture structure and thus has the high tensile strength and high fatigue strength properties of the wire. Besides, after the metallurgical bonding is achieved between the wires by sintering, a volume material composed of the wire is formed; the new material composed of the wire has the rigidity of the conventional volume material, and can be processed into mechanical parts or dies like ordinary metal materials; the new material has higher mechanical properties and a longer service life compared with ordinary metal materials, with the safety and reliability of parts improved, and thus it deserves to be promoted.

The examples described above are only the preferred examples of the present invention, and not intended to limit the scope of the present invention. Therefore, any changes made in accordance with the shapes and principles of the present invention are intended to be included within the scope of the present invention.

The invention claimed is:

1. A method for processing and manufacturing a porous metal structural material comprising:
    firstly, knitting metal wires to form a metal screen mesh strip, and
    coiling the metal screen mesh strip to form a coiled blank body, an outer-layer material of the coiled blank body covers an inner-layer material of the coiled blank body; then, sintering the coiled blank body, and then
    plastic working the coiled blank body so as to reduce gaps and reach a porosity that fulfills requirements,
    manufacturing and obtaining the porous metal structural material, and
    manufacturing mechanical structural parts by using a mechanical processing method,
    wherein before the metal screen mesh strip is coiled, metal powder is evenly distributed on the metal screen mesh strip and the thickness of the metal powder is controlled to be uniform; then
    the metal powder is sintered; and then
    the metal powder is evenly coiled between layers of the metal screen mesh strip; and
    after sintering and plastic working the coiled blank body, a powder metallurgy porous metal structural material reinforced by the metal screen mesh strip is obtained.

2. The method for processing and manufacturing a porous metal structural material according to claim 1, wherein the plastic working is performed before sintering, and plastic working and sintering are repeatedly performed.

3. The method for processing and manufacturing a porous metal structural material according to claim 1, wherein the powder metallurgy porous metal material is steel.

4. The method for processing and manufacturing a porous metal structural material according to claim 1, wherein the metal powder is rolled on the metal screen mesh strip, sintered and then the metal screen mesh strip is coiled to form the coiled blank body.

5. The method for processing and manufacturing a porous metal structural material according to claim 1, wherein the metal powder is formulated into a mixed slurry that is then uniformly distributed on the metal screen mesh strip, and then the metal powder is uniformly coiled between layers of the metal screen mesh strip, dried and then sintered.

6. The method for processing and manufacturing a porous metal structural material according to claim 1, wherein after the metal powder is formulated into a binder-containing mixture, the metal powder is uniformly distributed on and adhered to the metal screen mesh strip, uniformly coiled between layers of the metal screen mesh strip, and then sintered after the binder is removed by heating.

7. The method for processing and manufacturing a porous metal structural material according to claim 1, wherein the porous metal structural material is in the form of a bar, a tube, a section, a plate or a block.

8. The method for processing and manufacturing a porous metal structural material according to claim 1, wherein coiling the metal screen mesh strip means that the metal screen mesh strip is coiled on a mandrel by rotating the mandrel, thus forming the coiled blank body.

9. The method for processing and manufacturing a porous metal structural material according to claim 8, wherein the mandrel is a rod mandrel, a plate mandrel or a tubular mandrel.

* * * * *